United States Patent [19]

Bernier

[11] Patent Number: 4,629,887

[45] Date of Patent: Dec. 16, 1986

[54] PLASMA EXCITATION SYSTEM

[75] Inventor: John A. Bernier, Lexington, Mass.

[73] Assignee: Allied Corporation, Morristown, N.J.

[21] Appl. No.: 690,363

[22] Filed: Jan. 9, 1985

Related U.S. Application Data

[63] Continuation of Ser. No. 473,386, Mar. 8, 1983.

[51] Int. Cl.[4] .................... H01S 1/00

[52] U.S. Cl. .................... 250/251; 356/316

[58] Field of Search .................... 250/251; 219/121 PM; 356/316

[56] References Cited

U.S. PATENT DOCUMENTS

| | | | |
|---|---|---|---|
| 3,309,564 | 3/1967 | Poulsen | 219/121 PM |
| 3,467,471 | 9/1969 | Greenfield et al. | 219/121 PM |
| 3,958,883 | 5/1976 | Turner | 356/85 |
| 4,293,220 | 10/1981 | Denton et al. | 356/316 |

OTHER PUBLICATIONS

P. W. J. M. Boumans et al., "A Stabilized R.F. Argon-Plasma Torch for Emission Spectroscopy" (Phillips Tech Rev. 33, 50–59, 1973, No. 2).

S. Greenfield et al., "Automatic Multi-Samples Simultaneous Multi-Element Analysis with a H.F. Plasma Torch and Direct Reading Spectrometer", (Analytica Chimica Acta 74 (1975), 225–245).

J. Schmitz, "Design of an Inductively Coupled Plasma Source for Emission Spectrometry", (G.A.M.S., Paris, 31st May 1977).

Peter zur Nedden, "Experiences with a 50 MHz Free Running ICP Generator", Colloquium Spectroscopium International, Prague, Czechoslovakia, Sep. 1977, (Phillips Bulletin).

Arcs & Sparks (Ultra Carbon Corporation), Jun. 1969, vol. 14, No. 1, pp. 8–10; Specification Sheets, Radyne Limited, England (1966); Specification Sheet; Kontron Material-und Strukturanalyze GmbH.

*Primary Examiner*—Carolyn E. Fields
*Assistant Examiner*—Richard Hanig
*Attorney, Agent, or Firm*—Paul Yee; James Riesenfeld; Gerhard Fuchs

[57] ABSTRACT

A radio frequency excitor apparatus and method produce an inductively coupled plasma to heat an analytic sample. The apparatus includes a radio frequency generator mechanism for producing electrical power of selected radio frequency. The generator mechanism has a power output tuning mechanism comprised of at least one output tuning inductor for determining the generator radio frequency. A separate plasma load circuit is coupled to the generator mechanism and is comprised of a work coil and a series connected, impedance matching capacitor. The work coil is adapted to produce an inductively coupled plasma and the capacitor is adapted to substantially balance the combined inductive reactances of the work coil and plasma. A control mechanism for controlling the power input into the plasma load circuit stabilizes the plasma.

9 Claims, 8 Drawing Figures

PLASMA EXCITATION SYSTEM

This application is a continuation of application Ser. No. 473,386, filed Mar. 8, 1983.

BACKGROUND OF THE INVENTION

1. Field of the Invention

The invention relates to radio-frequency (rf) power generators. More particularly, it relates to rf generators for generating and exciting an inductively coupled plasma (ICP) employed in atomic emission spectrometry.

2. Description of the Prior Art

Inductively coupled plasmas (ICP) have been used to excite samples for analytical emission spectroscopy. The paper "Automatic Multi-Sample Simultaneous Multi-Element Analysis with a M.F. Plasma Torch and Direct Reading Spectrometer" by S. Greenfield, I. L. L. Jones, H. MCD. McGeachin and P. B. Smith, published in *Analytica Chimica Acta;* 74 (1975); discusses an ICP coupled with a 30-channel direct reading spectrometer with fully automatic sequential sampling, exposure and read-out.

The paper "A Stabilized R.F. Argon-Plasma Torch for Emission Spectroscopy" by P. W. J. M. Bowmans, F. J. deBoer and J. W. Ruiter, published in *Philips Technical Review* (1973); discusses a rf generator system for producing an inductively coupled argon plasma (ICAP). The system of Boumans, et al, is adapted to provide stabilized power to the ICAP and minimize plasma intensity variations which occur when a sample is introduced into the plasma.

In conventional excitation systems, such as those of Greenfield, et al. and Boumans, et al., a rf generator ordinarily provides power to combined tuning-work coil. This coil operates both as the inductor coil in the output tuning (tank) circuit of the generator and as the plasma producing work coil. The plasma is typically annular in shape, providing a tunnel region into which a sample is introduced for excitation.

Conventional exciter apparatus and systems have been adequate when the plasma is established and operating. However, during the critical periods of startup and plasma ignition, such prior systems typically operate in an unstable region of their operational envelopes. Complex controls have been required to closely regulate the power into the tuning-work coil to ensure reliable plasma ignition. As a result, the prior devices have been expensive, complex and bulky and have ordinarily required complicated three-phase power.

When generating power at radio-frequencies, the radiated power from the generator may be closely regulated and the AC frequency of operation kept within a specific allowed bandwidth to prevent rf interference with other devices, such as nearby communications equipment. Typically, the AC frequency has been substantially fixed by use of a crystal controlled oscillator. Generators with crystal controlled rf oscillators, however, typically require additional amplifier stages to develop the output power needed to produce and sustain an ICP, and often employ special rf transmission cables, rf connectors and associated impedance matching circuitry. In addition, special, complex tuning adjustment circuits have been required to compensate for resonant frequency shifts that occur in the output tuning circuits during periods of plasma ignition and plasma excitation of an analytic sample. During such periods, the rf power output tuning circuit becomes mismatched from the fixed oscillator frequency. This changes the power delivered into the tuning-work coil and causes fluctuations in the plasma intensity. The plasma may even extinguish. To compensate for this problem, complex circuits have been employed to closely regulate power output, voltage phase relations and resonant frequencies of the output tuning circuits to ensure adequate power into the plasma.

Radio-frequency generators which employ a free-running oscillator have generally been preferred because they are simpler and more economical than generators with fixed frequency oscillators. However, ordinary exciter systems using such generators experience very large frequency shifts sweeping over hundreds of kilohertz, particularly during plasma ignition. As a result, conventional generators with free-running oscillators exceed allowable operational bandwidths and have required bulky and costly rf shielding to prevent disruptive rf interference with other equipment.

Thus, these conventional plasma exciter apparatus have remained complex, expensive and bulky and have generally required complicated power supplies. Apparatus in which the generator output frequency is closely controlled have required additional amplifiers, additional transmission components and complicated control circuitry, particularly during plasma ignition, to regulate power into the plasma. Apparatus in which the rf generator employs a free-running oscillator have exhibited excessive frequency shifts and required substantial rf shielding. Because of their complexity, bulk and high cost, these conventional plasma excitation devices have been unsuitable for use in small office-type laboratories.

SUMMARY OF THE INVENTION

The invention provides an economical and efficient radio-frequency (rf) excitor apparatus and method for producing an inductively coupled plasma to heat an analytic sample. Generally stated the excitor apparatus includes a radio-frequency generator means for producing electrical power of selected radio frequency. The generator means has power output tuning means comprises of at least one output tuning inductor for determining the generator radio frequency. A separated plasma load circuit is coupled to the generator means and is comprised of a work coil and a series connected, impedance matching capacitor. The work coil is adapted to produce an inductively coupled plasma and the capacitor is adapted to substantially balance and counteract the combined inductive reactances of the work coil and plasma. Control means for controlling the power input into the plasma load circuit stabilize the plasma.

In accordance with the invention, there is further provided an excitation method for producing an inductively coupled plasma to heat an analytic sample. Electrical power of selected radio frequency is generated with an rf generator means having a power output tuning means. The power from the generator means is directed to a plasma load circuit having a separate work coil adapted to produce the inductively coupled plasma, and the power input to the separated work coil is controlled with control means operably coupled between the plasma load circuit and the generator means.

The exciter apparatus of the invention is versatile and suitable for use in small, office-type laboratories where three-phase power is generally unavailable. The apparatus requires only single-phase power and includes a free-running oscillator. Since the oscillator is free running, it automatically compensates for changing load impedance by shifting its frequency of oscillation to sustain maximum power transfer into the plasma.

The plasma load circuit advantageously separates and substantially isolates the plasma producing work coil from the output tuning circuit of the rf generator, and preferably is directly coupled to the rf generator to minimize coupling losses. Since the work coil is separated and substantially isolated from the rf generator tuning circuit, changes in the work coil impedance which occur during plasma ignition and the introduction of a sample into the plasma are for the most part not reflected back into the generator rf tuning circuit. As a result, the rf generator and exciter apparatus exhibit only a small frequency shift of less than about 100 KHZ even under the widely changing plasma load conditions of plasma ignition. In addition, the isolation of the work coil advantageously permits use of a longer work coil having a greater number of turns to produce a longer and broader plasma. The broader plasma, in turn, produces a more intense excitation of the sample which allows detection of smaller amounts of constituent elements renders a more precise analysis. Moreover, full power is delivered to the work coil even when the gas present at the coil is un-ionized. As a result, the complexity of plasma ignition is greatly reduced. Rf power into the plasma is stable throughout the ignition sequence, and the plasma can be initiated and expanded without utilizing complex controls to regulate power input to the work coil and plasma.

Thus, compared to conventional exciter devices having the work coil combined and integral with the rf power output tuning coil, the invention provides a more compact, efficient and economical exciter apparatus. The exciter apparatus more precisely analyzes a selected sample and more efficiently delivers maximum power to ignite and sustain an ICP load. Power into the ICP is stabilized without complex power supplies, without complicated power regulation and without causing excessive shifts in the rf power frequency.

BRIEF DESCRIPTION OF THE DRAWINGS

The invention will be more fully understood and further advantages will become apparent when reference is made to the following detailed description of the preferred embodiment of the invention and the accompanying drawings in which.

DESCRIPTION OF THE PREFERRED EMBODIMENTS

Figure 1:
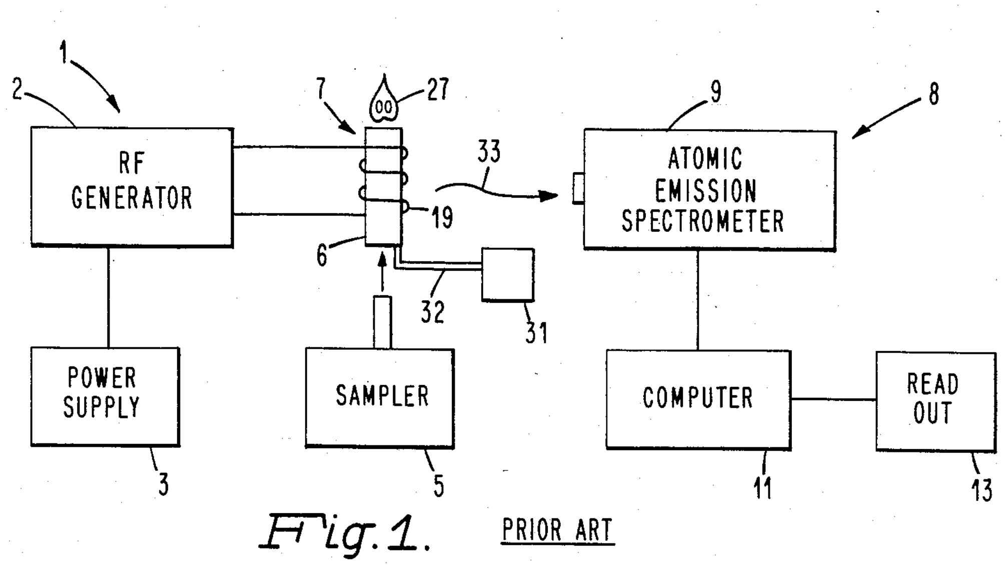
Fig. 1. PRIOR ART
FIG. 1 shows a schematic representation of the use of an inductively coupled plasma for atomic emissions spectroscopy.

FIG. 1 illustrates a schematic representation of an apparatus for analyzing the constituent elements of a sample of selected material. The apparatus is comprised of an exciter 1 and an analyzer means 8. Exciter 1 is comprised of rf generator 2, power supply 3 and plasma torch 7. Plasma torch 7 includes a torch tube 6, work coil 19 and a gas supply 31. Analyzer means 8 is comprised of spectrometer 9, computer 11 and readout means 13.

Figure 7:
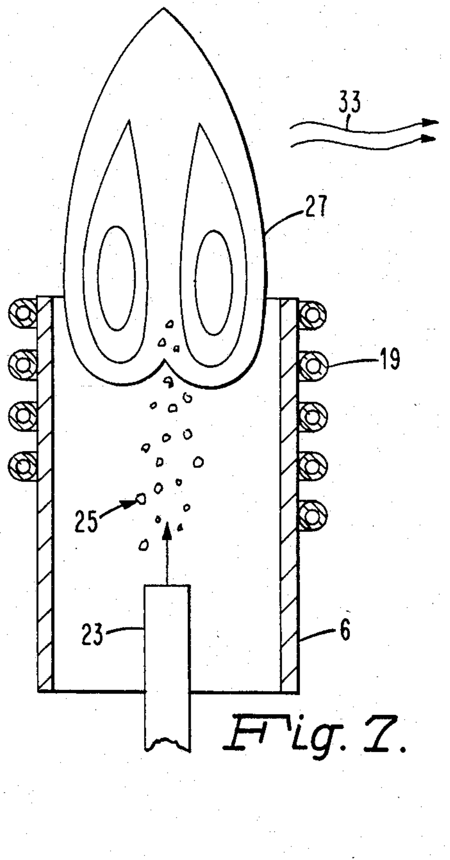
FIG. 7 shows a schematic representation of a longitudinal cross-section of an annular inductively coupled plasma.

To analyze a sample, rf generator 2 generates rf power and provides it to torch 7. Work coil 9 is wound around torch tube 6 and adapted to produce an inductively coupled plasma 27 from a suitable gas, such as argon, supplied from gas source 31. Referring to FIG. 7, sampler means 5 injects an analytic sample 25 (analyte) of selected material through conduit 23 into atomic emission spectra 33, which are characteristic of the constituent elements in the material.

Referring again to FIG. 1, spectra 33 is detected by spectrometer 9 to produce a spectrometer output signal. Computer 11 processes the spectrometer output signal and provides a readout analysis of the constituent elements and quantities thereof. For example, suitable readout means would include electronic displays and hard copy printouts.

Figure 2:
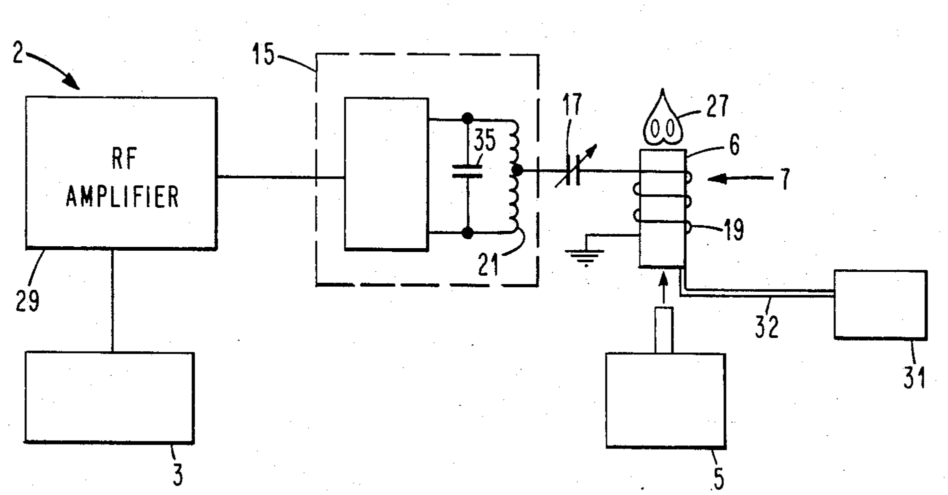
FIG. 2 shows a schematic representation of the exciter apparatus of the invention.

FIG. 2 shows a more detailed schematic block diagram of rf generator 2. The rf generator is comprised of rf amplifier 29, tuning means 15 and coupling means, such as capacitor 17. Power supply 3 provides power to rf amplifier 29 which is connected to power output tuning means 15. Tuning means 15 is comprised of at least one tuning inductor 21 and a tuning capacitor 35. Preferably the inductor and capacitor are connected in parallel to form an electronic, parallel resonant tank circuit. Coupling capacitor 17 is operably connected in series with separated work coil 19 and then operably connected to tuning inductor 21.

In operation, rf amplifier 29 and tuning means 15 in combination form an rf oscillator which provides the required rf power into tuning inductor 21. The resonant tank circuit formed by tuning inductor 21 and capacitor 35 controls the frequency of oscillation in accordance with well-known electronic principles. Preferably the component values are selected to provide oscillation at 27.12 MHz, the U.S. Industrial Band.

Coupling capacitor 17 is preferably a vacuum, variable capacitor. Capacitor 17 couples rf power into work coil 19 and provides an impedance matching means to maximize the power delivered into the coil and into plasma 27. The reactance of capacitor 17 is adjusted to balance and substantially counteract the combined reactances of coil 19 and plasma 27 to maximize the power delivered there into.

Substantially amounts of power are dissipated by tuning inductor 21 and work coil 19. Preferably these elements are constructed from tubular material, for example tubular copper, to allow passage therethrough of a suitable fluid coolant, such as water.

Gas source 31 provides a suitable gas, such as argon or nitrogen into torch 7. The high frequency magnetic field induced in coil 19 by rf generator 2 produces a magnetic field which ionizes the gas to produce a plasma which can reach temperatures of about 10,000°

K. Preferably the frequency of power and the gas flow are regulated to produce a stable, annular shaped plasma 27. Annular plasma 27 advantageously forms a stable "tunnel" region into which analyte can be efficiently and reliably introduced for excitation.

Figure 3:
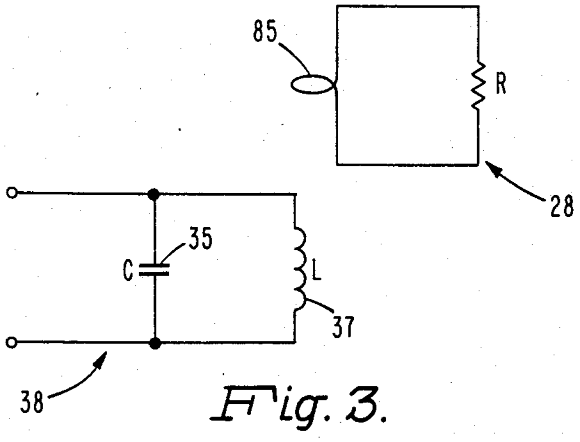
FIG. 3 shows a schematic of an equivalent circuit for an inductively coupled plasma.

Conventional excitor apparatus typically include a tuning inductor integral with the work coil as schematically shown in FIG. 3, generally at 38. The tank circuit has a tuned resonant frequency defined approximately by the formula 1/LC where: L=the inductance of coil 37 and C=the capacitance of capacitor 35. Such a configuration provides an economy of parts. However, when a plasma is initiated or "lit", plasma 27 is equivalent to a series circuit 28 of inductance L and resistance R inductively coupled to the tuning/work coil. Inductance L is substantially equivalent to a single turn coil located coaxial with work coil 19, and its effective inductance changes with the size and dimensions of plasma 27. When the plasma is lit, the tank circuit develops a new tuned resonant frequency approximately equal to 1/L'C where: L'=the effective equivalent inductance provided by the combination of coil 37 and the equivalent plasma circuit 28. A detailed discussion of the phenomena is provided in the article by Greenfield et al., particularly at pages 226–232. A similar phenomena occurs when a sample is introduced into the plasma for excitation. The presence of the sample changes the effective inductance of the work coil thus changing the resonant frequency of the tuned tank circuit and affecting the amount of power delivered to the work coil and plasma.

Fixed frequency rf generators, such as those employing crystal controlled oscillators require complicated power regulators to assure delivery of adequate power to the work coil to initiate and sustain plasma 27. Rf generators with free running oscillators, can shift their frequency of oscillation to insure delivery of adequate power to work coil 19, but the frequency shifts can often exceed the allowable operational band widths and necessitate the use of expensive and bulky rf shielding.

Figure 6:
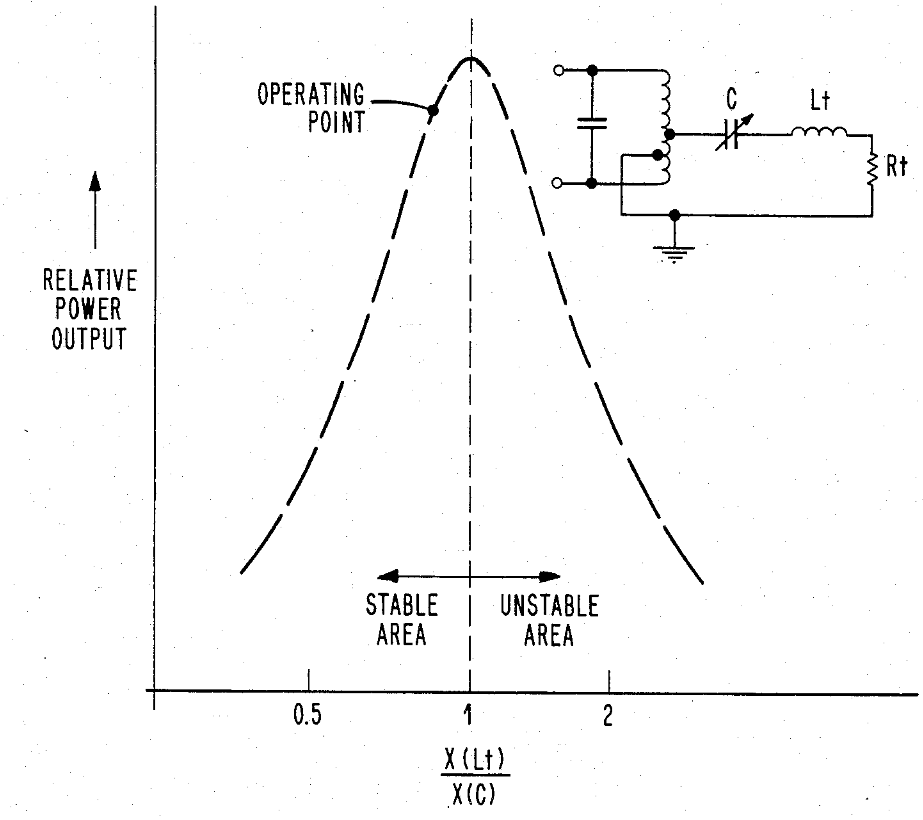
FIG. 6 shows a schematic of an inductively coupled plasma coupled to the plasma load circuit of the invention and a graph of power output versus an impedance ratio.

As shown in FIGS. 2 and 6, the invention advantageously separates tuning inductor 21 from work coil 19 with an impedance matching capacitor 17. The reactance of capacitor 17 is adjusted to substantially balance and counteract the combined inductive reactances of work coil 19 and plasma 27. Thus, the plasma load appears as a substantially resistive load to the output of rf generator 2 over a large band width of frequencies. The configuration minimizes changes in effective inductance seen by tuning means 15 during start-up and during the injection of sample into plasma 27. In addition, the configuration minimizes the shift in the tuned frequency of tuning means 15 and the output of rf generator 2. In conventional excitor apparatus the frequency shift can be reduced by limiting the number of turns in work coil 19 to about 1 or 2 turns. The fewer turns in coil 19 provides a smaller inductance and thus a smaller effective inductance change during changing plasma load conditions. As a result, less frequency shift occurs in the tuned output circuitry of the rf generator.

The invention, however, allows a much greater change in the effective inductance of work coil 19 while minimizing the effect on the tuned output of the rf generator. As a result, a work coil with greater number of turns can be employed without adversely affecting the rf generator output frequency. The greater number of turns provides a larger and broader plasma. The larger plasma in turn provides a larger heating zone which better excites an analytic sample. A more intense emissions spectra is then available to the spectrometric detector. For example, the present embodiment of the invention employs a three and one-half turn work coil.

Figure 4:
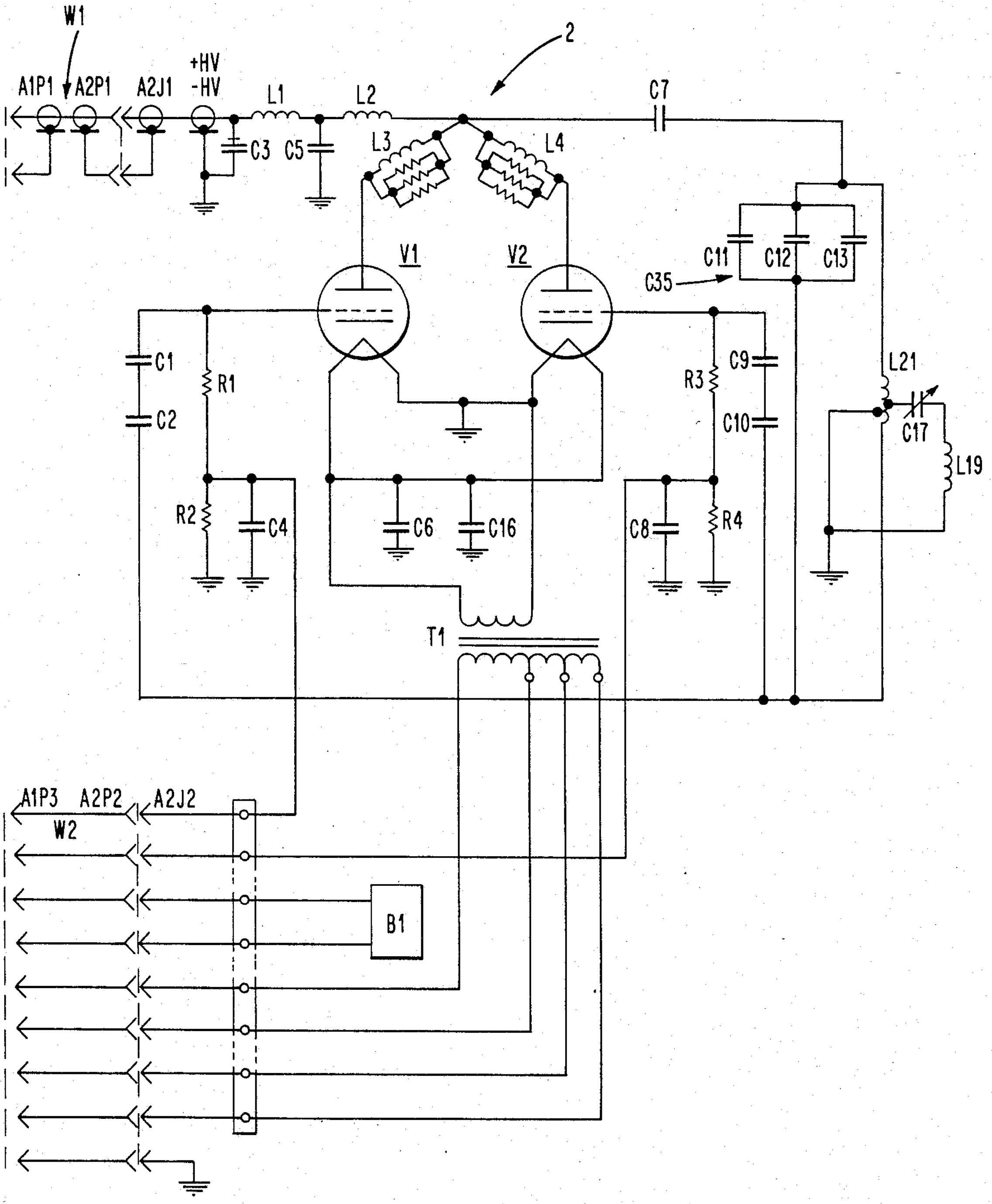
FIG. 4 shows a circuit diagram of the exciter apparatus employing an electron tube amplifier connected to tuning means to provide a Hartley-type rf oscillator.

FIG. 4 shows a preferred free running oscillator circuit employed in the excitor apparatus of the invention. High voltage enters the circuit at A2J1, is filtered by choke L1 and capacitors C3 and C5, and applied to the plates of V1 and V2 through quarter wave choke L2. Electron tubes V1 and V2 are parallel connected to provide the required power output and to reduce the effective plate impedance. It is readily apparent that additional tubes could be employed to raise the power output or that the multiple tubes could be reduced to a single large tube. Networks L3 and L4 are heavily damped inductances called parasitic suppressors that prevent intertube resonances in the parallel tube configuration. Transformer T1 provides filament power for both tubes. Capacitors C6 and C16 bypass any rf energy generated at the two filaments to ground. The voltage at the plates of the tubes is coupled to a parallel resonant circuit comprised of a triple capacitor C11, C12, C13 and an inductor L21 by way of coupling capacitor C7. This resonant circuit is tuned to oscillate at a nominal 27.12 MHz. In this circuit, a 180° out of phase voltage to power the tube grids is derived from the lower section of L21 which includes three sections connected in series. This voltage is applied in parallel to the grids of the oscillator tubes V1 and V2 by way of the grid leak capacitor combinations C1, C2 and C9, C10. Negative grid bias for tube V1 is generated by grid leak resistor R1. Negative grid bias for tube V2 is generated by grid leak resistor R3. Resistors R2 and R4 provide a measurement of the individual tube grid currents monitored in the power supply unit. Power is coupled to the plasma load coil from the center section of inductor L21. Tuning capacitor C17 compensates for the inductance formed by the plasma work coil L19 and the plasma itself. Air cooling is provided by a fan B1, and both inductor L21 and the plasma work coil L19 are water cooled. Thus, the shown circuit forms a Hartley-type oscillator, and with proper selection of the reactances of capacitor 35 and inductor 21, the circuit will oscillate at the preferred nominal frequency of 27.12 MHz.

A vacuum type is able to act as an oscillator because of its ability to amplify. Since the power required by the input of an amplifier tube is much less than the amplified output, it is possible to make the amplifier supply its own input. When this is done, oscillations will be generated and the tube acts as a power converter that changes the direct current power supplied to the plate circuit into alternating current energy in the amplifier output. In general, the voltage fed back from the output and applied to the grid of the tube must be 180° out of phase with the voltage existing across the load impedance of the plate circuit of the amplifier, and must have a magnitude sufficient to produce the output power necessary to develop the required input voltage. In the Hartley circuit this is accomplished by applying to the grid a portion of the voltage developed in the resonant circuit. This grid lead bias makes the oscillator self-starting and insures stable operation under the desired voltage and current relations. The use of a grid leak makes the oscillator self-starting because when the plate voltage is first supplied, the grid bias is zero, making the plate current, and hence the amplification, large. The transient voltage generated will start building up oscillations at the frequency of the resonant circuit. These oscillations cause the grid to draw current which biases the grid negative as a result of the grid leak resistance, This reduces the DC plate current until ultimately equilibrium is established at an amplitude such that the plate current is reduced to the point where the amplification is exactly 1. The grid leak provides a stability because any decrease in the amplitude of oscillation also reduces the bias developed by the grid leak arrangement, thereby increasing the grid drive and increasing the amplitude of oscillation.

Referring to FIG. 3, the rf coil containing the plasma (plasma work coil) may be regarded as the primary coil of a kind of a transformer. A plasma, which also has inductance, acts as the secondary winding 85 consisting of a single turn. The coupling between the primary and secondary windings (coupling factor) increases with the diameter of the plasma. Fluctuations in the energy content of the plasma affect the diameter of the plasma through temperature changes; the situation resembles that of a gas at constant pressure and changing temperature.

FIG. 6 illustrates how the variation of the coupling factor can give stabilization. Arranged in series, $L_t$ and $R_t$ represent the effective impedance constituted by the plasma work coil and the plasma. Variable capacitor C is adjusted such that the maximum power to the plasma is delivered when $X(C)=X(L_t)$, where capacitive impedance $X(C)=1/\omega C$, and inductive impedance, $X(L_t)=\omega L_t$. At this point, the load appears to be entirely resistive. It is well known that during the growth of a plasma the coupling factor increases and the inductance, $L_t$ decreases. However, during injection of a sample, the plasma is cooled and shrinks. The coupling factor decreases causing $L_t$ to increase. If an operating point is chosen to the left of load circuit resonance, as $L_t$ increases $X(L_t)$ will increase, increasing power to the plasma to compensate for the reduced temperature from the sample aspiration. Operation to the right of load circuit resonance results in an unstable plasma. If under these conditions $L_t$ increases, $X(L_t)$ will still increase but power to the plasma will now decrease causing the plasma to oscillate or even extinguish.

Figure 8:
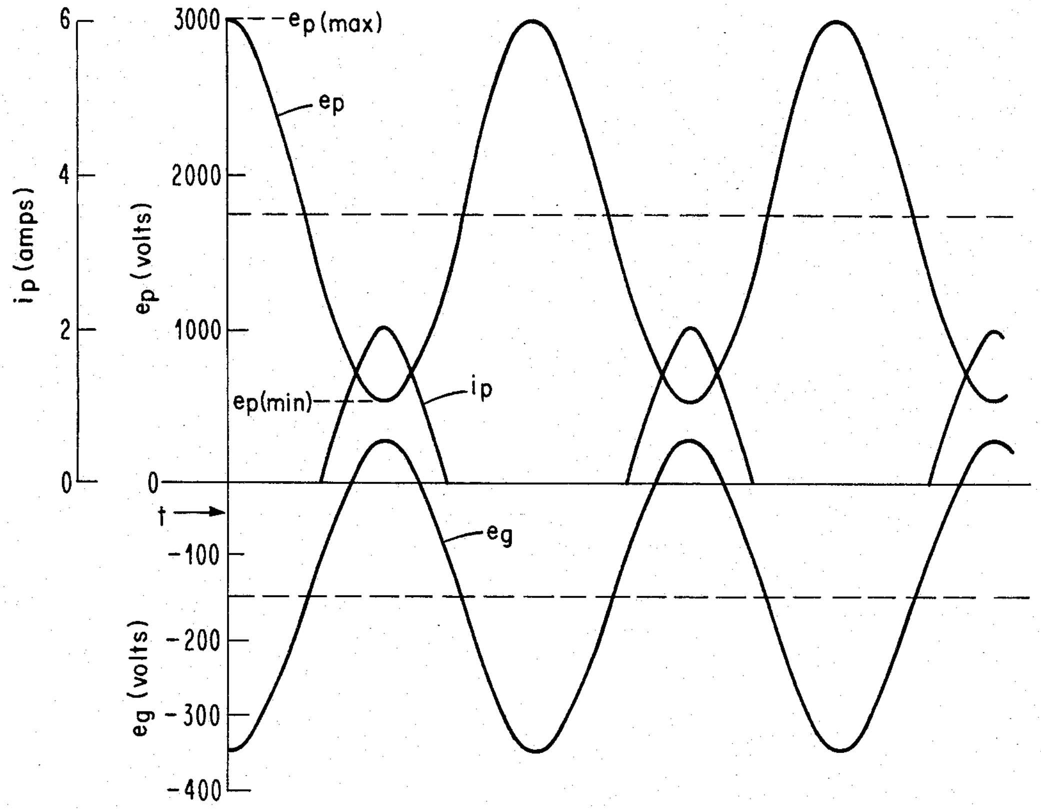
FIG. 8 shows a graph of plate voltage, plate current and grid voltage as a function of time.

A second form of compensation stablizes the magnitude of the oscillations in the resonant circuit. With reference to FIG. 8, it can be seen that changing the load resistance in the resonant circuit; i.e. the plasma; has little effect on the amplitude of oscillation but does change the DC plate current. When the resistance of the resonant circuit increases, the amplitude of the oscillations tends to decrease because the added resistance causes more energy to be consumed in the resonant circuit than is supplied from the plate voltage source. This makes the minimum plate voltage, $e_p$ (min) larger, increasing the amplitude of the plate current ($i_p$) pulses and resulting in the resonant circuit receiving additional energy. The amplitude of oscillation assumes a new equilibrium point in which the enlarged plate current impulses supply sufficient energy to the resonant circuit to stabilize the amplitude. A small percentage change in $e_p$ peak-to-peak amplitude causes a much greater percentage change in $e_p$ (min) resulting in a boot strap effect to stabilize the amplitude. The plot of $e_g$ represents the grid voltage.

The third form of stabilization is provided by the fact that when the $L_t$ of FIG. 6 changes, the inductance of the resonant circuit changes. However, the current in the resonant circuit will remain at a maximum by slightly shifting the fundamental frequency. This insures the basic system stays "in tune" over the required operating conditions.

The resultant free running oscillator design minimizes changes in the power delivered to tuning inductor 21 caused by the ignition of plasma 27 or caused by the introduction of analytic sample into the plasma. Thus, rf amplifier 29 can oscillate and deliver substantially full power to work coil 19 even when un-ionized argon gas is present in torch 7. Full power is available to ignite and sustain the plasma without complex regulation of power frequency and phase relation during the ignition process. During plasma ignition or during the introduction of sample into the plasma, small frequency shifts automatically occur to maintain the rf power delivered to the plasma. The configuration advantageously produces only a very small frequency shift, and the rf output easily stays within the allowed bandwidth. The maximum frequency shift is typically limited to less than about 100 KHz.

Figure 5:
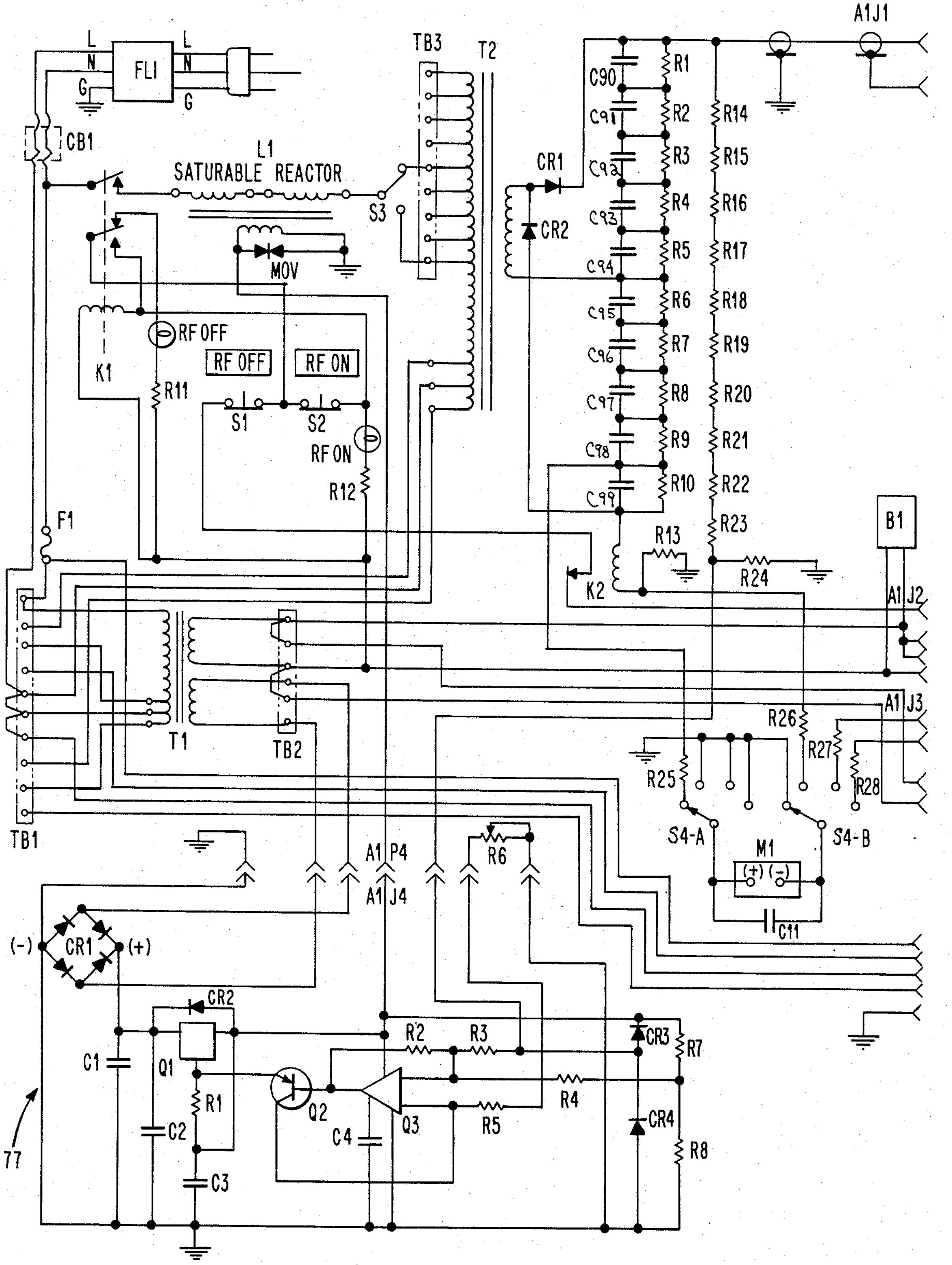
FIG. 5 shows a circuit diagram of a power supply employed with the invention.

A regulated power supply connected to terminals A2J1 regulates the plate voltages of tubes V1 and V2, thereby maintaining substantially constant AC voltage output from rf generator 2 under conditions of changing plasma load and changing primary line power. FIG. 5 shows a schematic diagram of a power supply employed in the invention. Control of the rf output of the rf excitor, or head unit, is accomplished by varying the high voltage output of the power supply. This is accomplished by changing the DC current in the control winding of saturable reactor L1. Increasing the current causes the iron core of the saturable reactor to saturate allowing a greater percentage of the input power to be applied to the primary of transformer T2, thereby increasing the high voltage output.

Line power enters through line filter FL1 and is protected and switched by front panel circuit breaker CB1. For control purposes, this power is applied through fuse F1 to supply primary power for the filament transformer in the rf head as well as primary power for the control transformer T1. Control transformer T1 provides power for relay and plasma head control and the fan circuits as well as power for use by the regulator board. Main power is switched by relay K1 which is controlled by front panel push button switches S1 and S2. The front panel pilot lights indicate the presence of control power and the position of relay K1. Power from relay K1 is controlled by saturable reactor L1 and is applied through the front panel tab select run-start switch S3 to the primary of high voltage transformer T2. The output of transformer T2 is rectified by the voltage doubler circuit consisting of rectifiers CR1 and CR2 and capacitor bank C90–C99. The output voltage is transferred to the rf exciter generator head 2 by cable W1. The return current from the rf head unit is measured through resistor 13 and overload relay K2. Overload current cause the contact of K2 of open, thereby dropping out relay K1 which turns off the high voltage.

The regulator printed circuit (PC) board generates the DC currents to control the saturable reactor. Referring to the P.C. board section 77 of FIG. 5, two external inputs provide input signals for use by the regulator board. The first, potentiometer R6 located on the front panel provides an input to set the high voltage level of the power supply unit. The second, a percentage of the output voltage, is generated by a voltage divider comprised of resistors R14–R23 along with resistor R24.

Potentiometer R6 acting through resistor R5 and transistor Q2 controls the set point of a three terminal regulator Q1. Input power for Q1 is generated from the low voltage winding of T1, full-wave rectifier CR1 and capacitor C1. The output of Q1 is connected to the control winding of the saturable reactor L1 to directly control the high voltage level. Regulation of the high voltage level is accomplished by feeding back the voltage divider signal to operational amplifier Q3 by resistors R2 and R3. Since the junction of R2 and R3 are connected to the negative terminal of Q3, the output of Q3 changes inversely with changes in the high voltage level. The output of Q3 is applied through Q2 to the control input of Q1 closing the inverse feed back loop. A connector J2 is provided to supply 110 V power and interlock with the plasma torch enclosure system. A terminal of connector J2 is interlocked with the plasma torch enclosure system to shut down the rf power under certain error conditions, such as low cooling water pressure, and low argon gas pressure.

Having thus described the invention in rather full detail, it will be understood that these details need not be strictly adhered to but that various changes and modifications may suggest themselves to one skilled in the art, all falling within the scope of the invention as defined by the subjoined claims.

I claim:

1. A radio frequency exciter apparatus for producing an inductively coupled plasma to excite an analytic sample, comprising:

(a) radio frequency generator means for producing electrical power of selected radio frequency, said generator means having power output tuning means, comprised of at least one output tuning inductor means and a tuning capacitor means connected in parallel therewith, for determining said generator radio frequency, said tuning inductor means having a series connection of a first portion, a second, center, portion and a third portion;

(b) a separate plasma load circuit connected to said generator means and comprised of a work coil means and a series connected, impedance matching capacitor, wherein said plasma load circuit is directly connected to said output inductor, said work coil means produces an inductively coupled plasma and said impedance matching capacitor means is used to substantially balance the combined inductive reactances of said work coil means and plasma; and (c) control means for controlling the power input into said plasma load circuit to stabilize said plasma and reduce fluctuations thereof;

(d) wherein said output tuning inductor means first portion is connected between a first side of said tuning capacitor means and said direct connection to the plasma load circuit, and said center portion is connected between said direct connection to the plasma load ground and a second side of said tuning capacitor means, said connections comprising means for automatically compensating for changing load impedance by shifting the frequency of said generator means.

2. An apparatus as recited in claim 1, wherein said impedance matching capacitor is a vacuum, variable capacitor.

3. An apparatus as recited in claim 1, further comprising power supply means for regulating the power input to said radio frequency generator, thereby maintaining a substantially constant generator output voltage.

4. An apparatus as recited in claim 1, wherein said generator means comprises an electron tube amplifier connected with said output tuning means to provide a Hartley-type radio frequency oscillator.

5. An apparatus as recited in claim 1, wherein said control means comprises a series circuit comprised of said work coil means and said impedance matching capacitor, wherein said impedance matching capacitor is adjusted to maintain a capacitive impedance which is equal to or greater than the combined inductive impedances of said work coil means and plasma when exciting said sample, so as to increase rf power delivered to said output tuning inductor as said combined inductive impedances are increased by the exciting of said sample.

6. An apparatus as recited in claim 5, wherein said control means further comprises a variable resistive impedance in said plasma, said resistive impedance being inductively coupled into and through said plasma load circuit and through said direct connection into said output tuning inductor of said generator means, thereby increasing the rf power delivered to said output tuning inductor as said resistive impedance is increased by the exciting of said sample.

7. A radio frequency excited apparatus for producing an inductively coupled plasma to excite an analytic sample, comprising:

(a) a Hartley-type radio frequency generator means for producing electrical power of selected radio frequency, said generator means having power output tuning means comprised of at least one output tuning inductor and tuning capacitor connected in parallel therewith for determining said generator radio frequency, and said tuning inductor having a series connection of a first portion, a second, center portion and a third portion;

(b) a separate plasma load circuit coupled to said generator means and comprised of a work coil and a series connected, impedance matching capacitor, wherein said plasma load circuit is directly connected to said output inductor, said work coil is adapted to produce an inductively coupled plasma and said capacitor is adapted to substantially balance the combined inductive reactances of said work coil and plasma; and (c) control means for controlling the power input into said plasma load circuit to stabilize said plasma and reduce fluctuations thereof, which comprises, said impedance matching capacitor adjusted to maintain a capacitive impedance which is equal to or greater than the combined inductive impedances of said work coil and plasma when exciting said sample, and a variable resistive impedance in said plasma, said resistive impedance being inductively coupled into and through said plasma load circuit and through said direct connection into said output tuning inductor of said generator means, thereby increasing the rf power delivered to said output tuning inductor as said resistive impedance and said combined inductive impedances are increased by the exciting of said sample;

(d) wherein said output tuning inductor first portion is connected between a first side of said tuning capacitor and said direct connection to the plasma load circuit, said center portion is connected between said direct connection to the plasma load circuit and ground, and said third portion connected between ground and a second side of said tuning capacitor.

8. A method for atomic emission spectrometric analysis, comprising the steps of:

(a) generating electrical power of selected radio frequency with a Hartley-type radio frequency generator means having a power output tuning means, comprised of at least one output tuning inductor and a tuning capacitor connected in parallel therewith, for determining said generator radio frequency said tuning inductor having a first portion connected between a first side of said tuning capacitor and said direct connection to the plasma load circuit, a second, center, portion connected between said direct connection to the plasma load circuit and ground, and a third portion connected between ground and a second side of said tuning capacitor;

(b) directing said radio frequency power from said tuning means to a separate plasma load circuit, which is directly connected to said tuning inductor and which includes a coupling capacitor connected in series with a separate work coil adapted to produce an inductively coupled plasma;

(c) stabilizing the power directed into said plasma to reduce fluctuations thereof by adjusting said coupling capacitor to maintain a capacitive impedance thereof which is equal to or greater than the combined inductive impedances of said work coil and plasma when exciting an analytic sample, and by inductively coupling a variable resistive impedance in said plasma into and through said plasma load circuit and through said direct connection into said output tuning inductor of said generator means, thereby increasing the rf power delivered to said output tuning inductor as said resistive impedance and said combined inductive impedances are increased by the exciting of said sample;

(d) introducing an analytic sample of material into said plasma to produce atomic emission spectra characteristic of the constituent elements of said sample; and (e) analyzing said spectra to detect said constituent elements and the quantities thereof.

9. An excitation method for producing an inductively coupled plasma, comprising the steps of:

(a) generating electrical power of selected radio frequency with a rf generating means having a power output tuning means comprised of at least one output tuning inductor and a tuning capacitor connected in parallel therewith; wherein said tuning inductor has a first portion, a second, center portion and a third portion, connected in series, and said rf generating means includes a Hartley-type oscillator;

(b) directing said rf power from said power output tuning means to a plasma load circuit which is directly connected to said tuning inductor and which is comprised of a coupling capacitor connected in series with a separate work coil adapted to produce said inductively coupled plasma, wherein said tuning inductor first portion is connected between a first side of said tuning capacitor and said direct connection to the plasma load circuit, said center portion is connected between said direct connection to the plasma load circuit and ground, and said third portion is connected between ground and a second side of said tuning capacitor; and (c) controlling the power input to said separate work coil and reduce fluctuations thereof by adjusting said coupling capacitor to maintain a capacitive impedance which is equal to or greater than the combined inductive impedances of said work coil and plasma when exciting an analytic sample, and by inductively coupling a variable resistive impedance in said plasma into and through said output tuning inductor of said generator means, thereby increasing the rf power delivered to said output tuning inductor as said resistive impedance and said combined inductive impedances are increased by the exciting of said sample.

* * * * *